(12) United States Patent
Lu et al.

(10) Patent No.: US 11,530,784 B1
(45) Date of Patent: Dec. 20, 2022

(54) DIMMABLE LAMP TUBE

(71) Applicant: Xiamen PVTECH Co., Ltd., Fujian (CN)

(72) Inventors: Fuxing Lu, Fujian (CN); Rongtu Liu, Fujian (CN); Chun Ming Liu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 17/485,488

(22) Filed: Sep. 26, 2021

(30) Foreign Application Priority Data

Jun. 23, 2021 (CN) .......................... 202110700562.7

(51) Int. Cl.
| | |
|---|---|
| *F21K 9/278* | (2016.01) |
| *F21S 4/28* | (2016.01) |
| *F21V 23/04* | (2006.01) |
| *H05B 45/345* | (2020.01) |
| *H05B 45/395* | (2020.01) |
| *H05B 45/10* | (2020.01) |
| *H05B 45/50* | (2022.01) |
| *F21Y 115/10* | (2016.01) |

(52) U.S. Cl.
CPC ............... *F21K 9/278* (2016.08); *F21S 4/28* (2016.01); *F21V 23/04* (2013.01); *H05B 45/345* (2020.01); *H05B 45/395* (2020.01); *H05B 45/50* (2020.01); *F21Y 2115/10* (2016.08); *H05B 45/10* (2020.01)

(58) Field of Classification Search
None
See application file for complete search history.

(56) References Cited

U.S. PATENT DOCUMENTS

| | | | | |
|---|---|---|---|---|
| 9,510,400 | B2 * | 11/2016 | Scapa ..................... | H05B 45/00 |
| 2015/0022114 | A1 * | 1/2015 | Kim ........................ | F21K 9/272 |
| | | | | 315/294 |
| 2015/0252479 | A1 * | 9/2015 | Nakano ............. | C23C 16/45544 |
| | | | | 438/680 |
| 2021/0392726 | A1 * | 12/2021 | Yang ....................... | F21V 23/04 |

* cited by examiner

*Primary Examiner* — Anh Q Tran
(74) *Attorney, Agent, or Firm* — Winston Hsu

(57) ABSTRACT

A dimmable lamp tube is provided, which includes a first lamp head, a second lamp head and a lamp tube body. The first lamp head has a brightness adjustment switch. The second lamp head has a power adjustment switch. The lamp tube body includes a circuit board and a plurality of light-emitting elements. The light-emitting elements are disposed on the circuit board. The circuit board includes a brightness adjustment switch connection terminal and a power adjustment switch connection terminal. The brightness adjustment switch is connected to the brightness adjustment switch connection terminal and the power adjustment switch is connected to the power adjustment switch connection terminal.

6 Claims, 8 Drawing Sheets

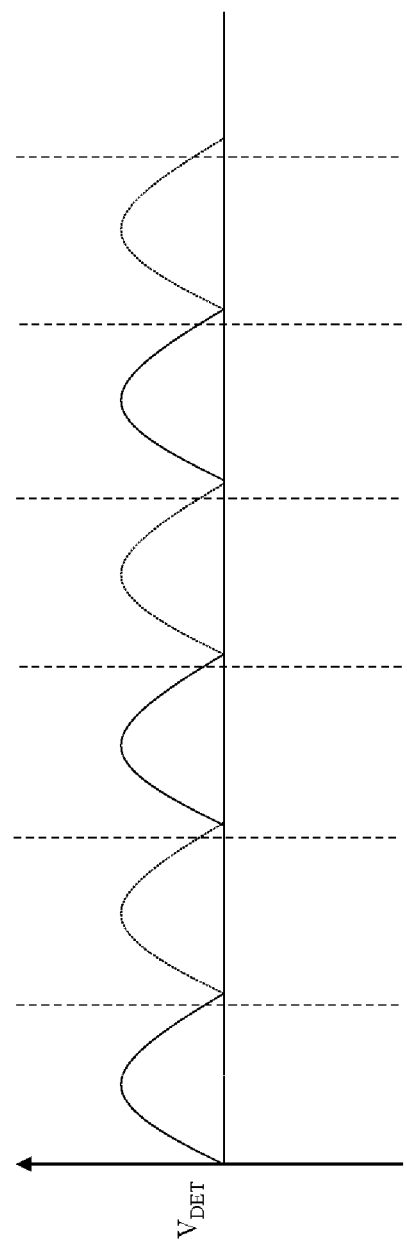

DIMMABLE LAMP TUBE

CROSS REFERENCE TO RELATED APPLICATION

This application claims the benefit of priority to China Patent Application No. 202110700562.7, filed Jun. 23, 2021, and included herein by reference in its entirety.

BACKGROUND OF THE INVENTION

1. Field of the Invention

The present invention relates to a lamp tube, in particular to a dimmable lamp tube.

2. Description of the Prior Art

Compared with conventional lamp tubes, lamp tubes adopting light-emitting diodes (LED) have many advantages which conventional lamp tubes lack, such as energy-saving, environmentally-friendly, high efficiency, long service life, small size, etc. The demand for high-efficiency lighting devices in many countries keeps increasing due to global warming, energy crisis, electricity consumption increase, and other factors. Accordingly, it has become an inevitable trend to replace conventional fluorescent tubes with high electricity consumption by LED lamp tubes.

In general, LED lamp tubes are usually applied to classrooms, libraries, exhibition centers, conference rooms, hotels and other public places. However, the lighting devices of these places are usually turned on in full power even if there is no one in these places, and cannot be frequently turned on and turned off, which would result in extremely high electricity consumption. Besides, the lighting devices in these places also need to be turned on in night, which forms a contradictory application phenomenon.

SUMMARY OF THE INVENTION

One embodiment of the present invention provides a dimmable lamp tube, which includes a first lamp head, a second lamp head and a lamp tube body. The first lamp head has a brightness adjustment switch. The second lamp head has a power adjustment switch. The lamp tube body includes a circuit board and a plurality of light-emitting elements. The light-emitting elements are disposed on the circuit board. The circuit board includes a brightness adjustment switch connection terminal and a power adjustment switch connection terminal. The brightness adjustment switch is connected to the brightness adjustment switch connection terminal and the power adjustment switch is connected to the power adjustment switch connection terminal.

In one embodiment, the circuit board further includes a rectification filter circuit and a constant-current control circuit. The rectification filter circuit is connected to the constant-current control circuit and the constant-current control circuit is connected to the light-emitting elements.

In one embodiment, the circuit board further includes a power source input terminal and the power source input terminal is connected to the rectification filter circuit.

In one embodiment, the circuit board further includes a low-dropout regulating power source circuit and the rectification filter circuit is connected to the low-dropout regulating power source circuit.

In one embodiment, the circuit board further includes a leakage protection circuit is connected to the rectification filter circuit and the low-dropout regulating power source circuit.

In one embodiment, the circuit board further includes an intelligent control circuit. The brightness adjustment switch connection terminal and the power adjustment switch connection terminal are connected to the intelligent control circuit. The intelligent control circuit is connected to the rectification filter circuit, the constant-current control circuit, the low-dropout regulating power source circuit and the leakage protection circuit.

In one embodiment, the power source input terminal is connected to a wall switch.

In one embodiment, the light-emitting elements are light-emitting diode beads.

In one embodiment, the lamp tube body further includes a housing. The circuit board and the light-emitting elements are disposed in the housing.

In one embodiment, the brightness adjustment switch and the power adjustment switch are toggle switches, rotary switches and push-button switches.

As described above, the dimmable lamp tube according to the embodiments of the present invention may have one or more of the following advantages:

(1) In one embodiment of the present invention, the dimmable lamp tube has a brightness adjustment switch, a power adjustment switch and a proper circuit design corresponding thereto. Therefore, the user can appropriately adjust the brightness and the power of the dimmable lamp tube according to location and time so as to satisfy the lighting requirements of different locations and time periods. Besides, the electricity consumption can be also significantly reduced in order to achieve energy-saving.

(2) In one embodiment of the present invention, the dimmable lamp tube can achieve multi-step brightness/power adjustment, smooth brightness/power adjustment and stepless brightness/power adjustment. Thus, the brightness and power of the dimmable lamp tube can completely satisfy the requirements in actual applications.

(3) In one embodiment of the present invention, the dimmable lamp tube further includes the leakage protection circuit, which can avoid that the user is electrocuted due to electrical leakage after one end of the lamp tube is connected to the power source. Accordingly, the safety of the dimmable lamp tube can be further enhanced.

4) In one embodiment of the present invention, the dimmable lamp further includes an intelligent control circuit, so the dimmable lamp tube can be integrated with a wall switch, a microwave radar control module and a human body infrared module with a view to realize different control mechanisms. Thus, the application of the dimmable lamp tube can be more comprehensive.

(5) In one embodiment of the present invention, the clever design of the dimmable lamp tube can achieve the desired technical effects without significantly increasing the cost thereof, so the dimmable lamp tube can have high commercial value.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 4A, FIG. 4B and FIG. 4C are schematic views for illustrating the leakage protection circuit of the dimmable lamp tube in accordance with the first embodiment of the present invention.

DETAILED DESCRIPTION

The technical content of the present invention will become apparent by the detailed description of the following embodiments and the illustration of related drawings as follows.

Figure 1:
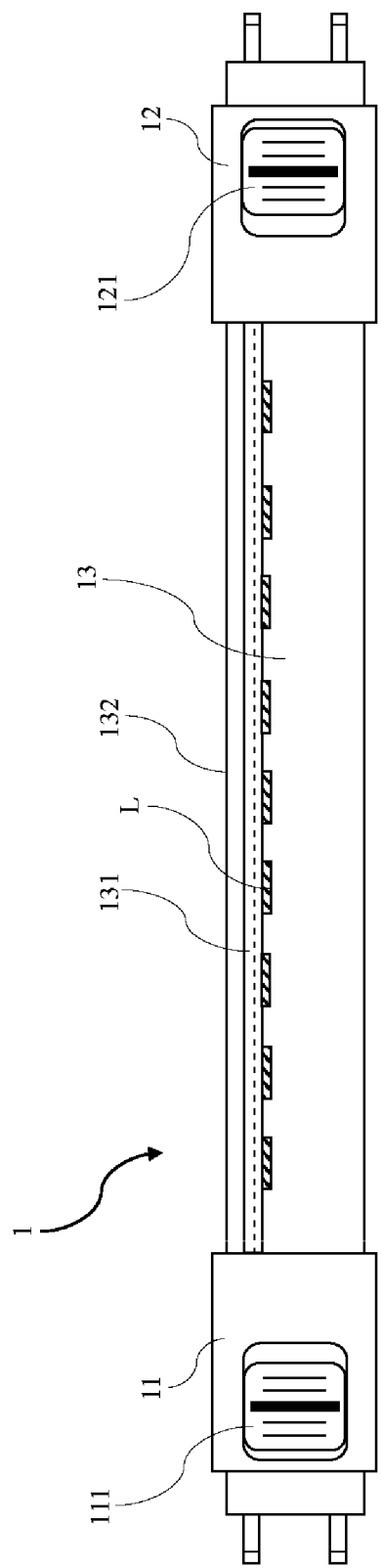
FIG. 1 is a view for illustrating the structure of a dimmable lamp tube in accordance with a first embodiment of the present invention.
Figure 2:
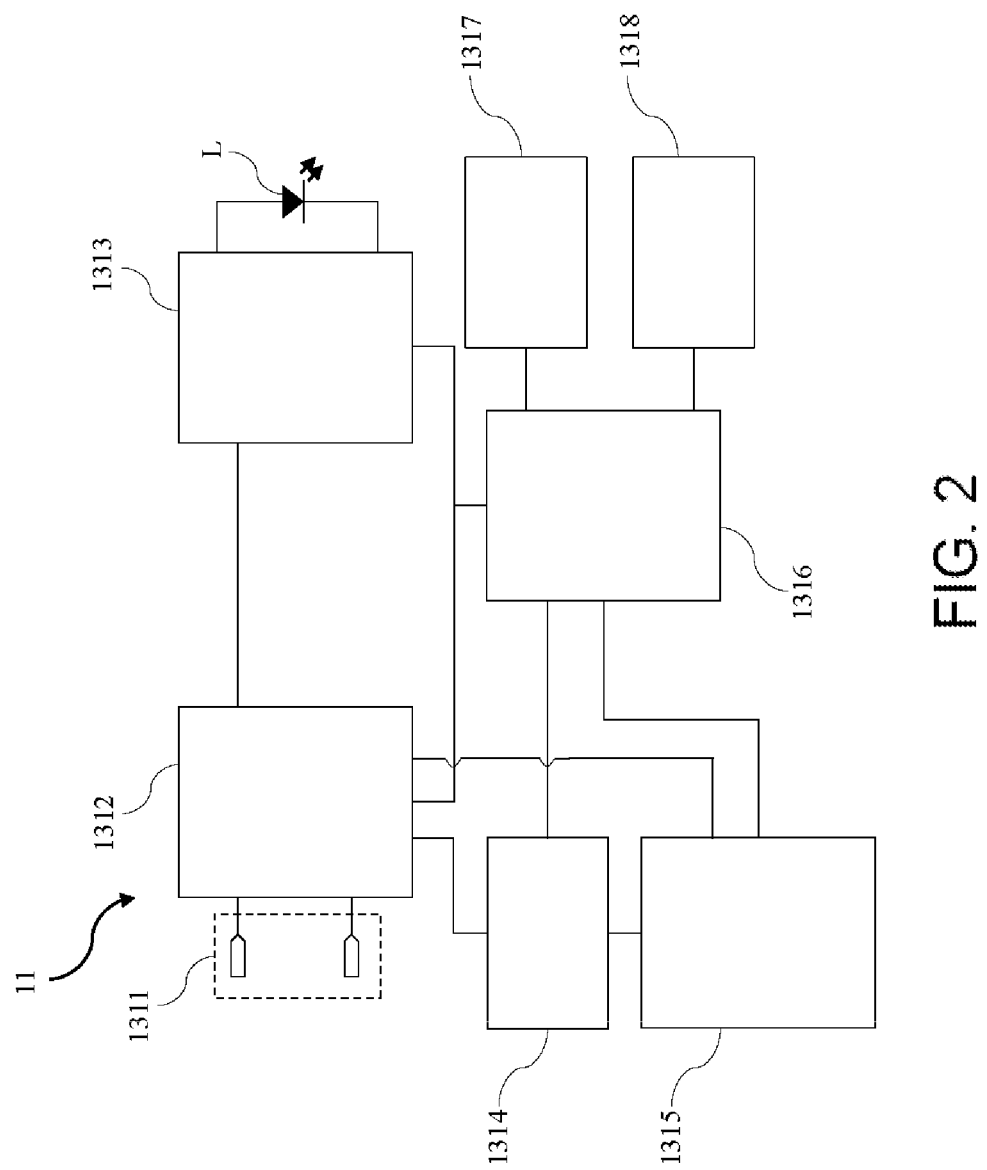
FIG. 2 is a view for illustrating the circuit of the dimmable lamp tube in accordance with the first embodiment of the present invention.

Please refer to FIG. 1 and FIG. 2. FIG. 1 is a view for illustrating the structure of a dimmable lamp tube in accordance with a first embodiment of the present invention. FIG. 2 is a view for illustrating the circuit of the dimmable lamp tube in accordance with the first embodiment of the present invention. As shown in FIG. 1 and FIG. 2, the dimmable lamp tube 1 includes a first lamp head 11, a second lamp head 12 and a lamp tube body 13.

The first lamp head 11 has a brightness adjustment switch 111. In this embodiment, the brightness adjustment switch 111 may be, but not limited to a toggle switch. In another embodiment, the brightness adjustment switch 111 may be a rotary switch, a push-button switch or other similar components.

The second lamp head 12 has a power adjustment switch 121. In this embodiment, the power adjustment switch 121 may be, but not limited to, a toggle switch. In another embodiment, the power adjustment switch 121 may be a rotary switch, a push-button switch or other similar components.

The lamp tube body 13 includes a circuit board 131, a housing 132 and a plurality of light-emitting elements L. The light-emitting elements L are disposed on the circuit board 131. The circuit board 131 and the light-emitting elements L are disposed in the housing 132. In this embodiment, the light-emitting elements L may be, but not limited to, light-emitting diode beads. In another embodiment, the light-emitting elements L may be other similar components.

As shown in FIG. 2, the circuit board 131 includes a power source input terminal 1311, a rectification filter circuit 1312, a constant-current control circuit 1313, a low-dropout regulating power source circuit 1314, a leakage protection circuit 1315, an intelligent control circuit 1316, a brightness adjustment switch connection terminal 1317 and a power adjustment switch connection terminal 1318. The light-emitting elements L are disposed on the circuit board 131.

The rectification filer circuit 1312 is connected to the power source input terminal 1311, and the power source input terminal 1311 is connected to a wall switch or other similar switches so as to connect to a power supply network. The rectification filter circuit 1312 includes a rectification circuit, an anti-EMI circuit, a surge protection circuit, etc., so as to power the circuit board 131 and other circuits. In this way, the dimmable lamp tube 1 can normally operate.

The constant-current control circuit 1313 is connected to the rectification filter circuit 1312 and the light-emitting elements L are connected to the constant-current control circuit 1313. The constant-current control circuit 1313 can provide a constant current for the light-emitting elements L, such that the light-emitting elements can operate in high efficiency.

The low-dropout regulating power source circuit 1314 is connected to the rectification filter circuit 1312. The leakage protection circuit 1315 is connected to the low-dropout regulating power source circuit 1314 and the rectification filter circuit 1312, which can avoid that the user gets electrocuted due to electrical leakage after one end of the lamp tube is connected to the power source.

The intelligent control circuit 1316 is connected to the rectification filter circuit 1312, the constant-current control circuit 1313, the low-dropout regulating power source circuit 1314 and the leakage protection circuit 1315. The brightness adjustment switch connection terminal 1317 and the power adjustment switch connection terminal 1318 are connected to the intelligent control circuit 1316. The brightness adjustment switch 111 and the power adjustment switch 121 are connected to the brightness adjustment switch connection terminal 1317 and the power adjustment switch connection terminal 1318 respectively.

In this way, the brightness adjustment switch 111 and the power adjustment switch 121 can be indirectly connected to the light-emitting elements L in order to adjust the brightness and power thereof. The user can switch the brightness adjustment switch 111 and the power adjustment switch 121 to adjust the brightness and power of the light-emitting elements L. After the signals are processed by the brightness adjustment switch connection terminal 1317 and the power adjustment switch connection terminal 1318, the intelligent control circuit 1316 selectively controls the brightness and power of the light-emitting elements L accordingly for comprehensive processing in order to execute corresponding adjustments. Moreover, the aforementioned low-dropout regulating circuit 1314 can provide electricity for the intelligent control circuit 1316, the brightness adjustment switch connection terminal 1317 and the power adjustment switch connection terminal 1318.

This embodiment can realize the following switching modes for power and brightness. (1) When the brightness level of the dimmable lamp tube 1 is at 30% (of the maximal brightness), the initial brightness of the dimmable lamp tube 1 is 30%. The brightness of the dimmable lamp tube 1 is changed to be 100% after the user "turns off and then turns on the wall switch" in a short time. The brightness of the dimmable lamp tube 1 is switched between 30% and 100% if the user repeatedly "turns off and then turns on the wall switch" in a short time. (2) When the brightness level of the dimmable lamp tube 1 is at 60%, the initial brightness of the dimmable lamp tube 1 is 60%. The brightness of the dimmable lamp tube 1 is changed to be 100% after the user "turns off and then turns on the wall switch" in a short time. If the dimmable lamp tube 1 is in off state, the brightness of the dimmable lamp tube 1 is 60% after the user turns on the dimmable lamp tube 1. If the user repeatedly "turns off and then turns on the wall switch" in a short time, the brightness of the dimmable lamp tube 1 is switched between 60% and 100%. (3) When the brightness level of the dimmable lamp tube 1 is at 100%, the brightness of the dimmable lamp tube 1 gradually increases from 10% until the brightness of the dimmable lamp tube 1 reaches 100%. If the user "turns off and then turns on the wall switch" in a short time during the process of the brightness of the dimmable lamp tube 1 gradually increasing, the brightness of the dimmable lamp tube 1 stays at the current brightness level ("turning off and then turning on the wall switch in a short time" just likes pressing a pause button) without increasing. If the brightness of the dimmable lamp tube 1 stays at the current brightness level, the brightness of the dimmable lamp tube 1 remains unchanged after the user "turns off and then turns on the wall switch" in a short time. If the user would like to perform the dimming function, the user needs to turn off the wall switch and then turn on the wall switch after a while. (4) When the brightness level of the dimmable lamp tube 1 is at 100%, the dimming function starts from 10% after the user switches the power of the dimmable lamp tube 1.

As set forth above, the dimmable lamp tube 1 has the brightness adjustment switch 111, the power adjustment switch 112 and the proper circuit design corresponding thereto, so the user can adjust the brightness and power of the dimmable lamp tube 1 in order to achieve a desired illuminance. When the installation of the dimmable lamp tube 1 is finished, the user can adjust the brightness and power of the dimmable lamp tube 1 via a wall switch or an intelligent microwave radar control module with a view to satisfy the illuminance requirements of different locations and time periods. Accordingly, the electricity consumption can be greatly reduced in order to achieve energy-saving and environment protection.

In addition, the brightness adjustment switch 111 and the power adjustment switch 112 of the dimmable lamp tube 1 can achieve multi-step adjustment or stepless adjustment. Therefore, the user can flexibly and freely switch the brightness and power of the dimmable lamp tube 1 so as to conform to the requirements of various locations and time periods. Further, the user can perform the stepless dimming function by repeatedly switching the wall switch, so the user can more flexibly control the dimmable lamp tube 1.

Moreover, luminous decay may occur on the light-emitting elements L after the dimmable lamp tube 1 has been used for a long time. In this case, the user can increase the brightness of the dimmable lamp tube 1 by one level or two levels in order to achieve constant illuminance. In this way, the illuminance of the dimmable lamp tube 1 can be always sufficient.

Furthermore, the intelligent control circuit 1316 and other circuits of the dimmable lamp tube 1 can be modularized, and the dimmable lamp tube 1 can easily access human body infrared lights or microwave radar signals. Thus, the dimmable lamp tube 1 can be more flexibly in use and more comprehensively in application.

The embodiment just exemplifies the present invention and is not intended to limit the scope of the present invention; any equivalent modification and variation according to the spirit of the present invention is to be also included within the scope of the following claims and their equivalents.

Figure 3A:
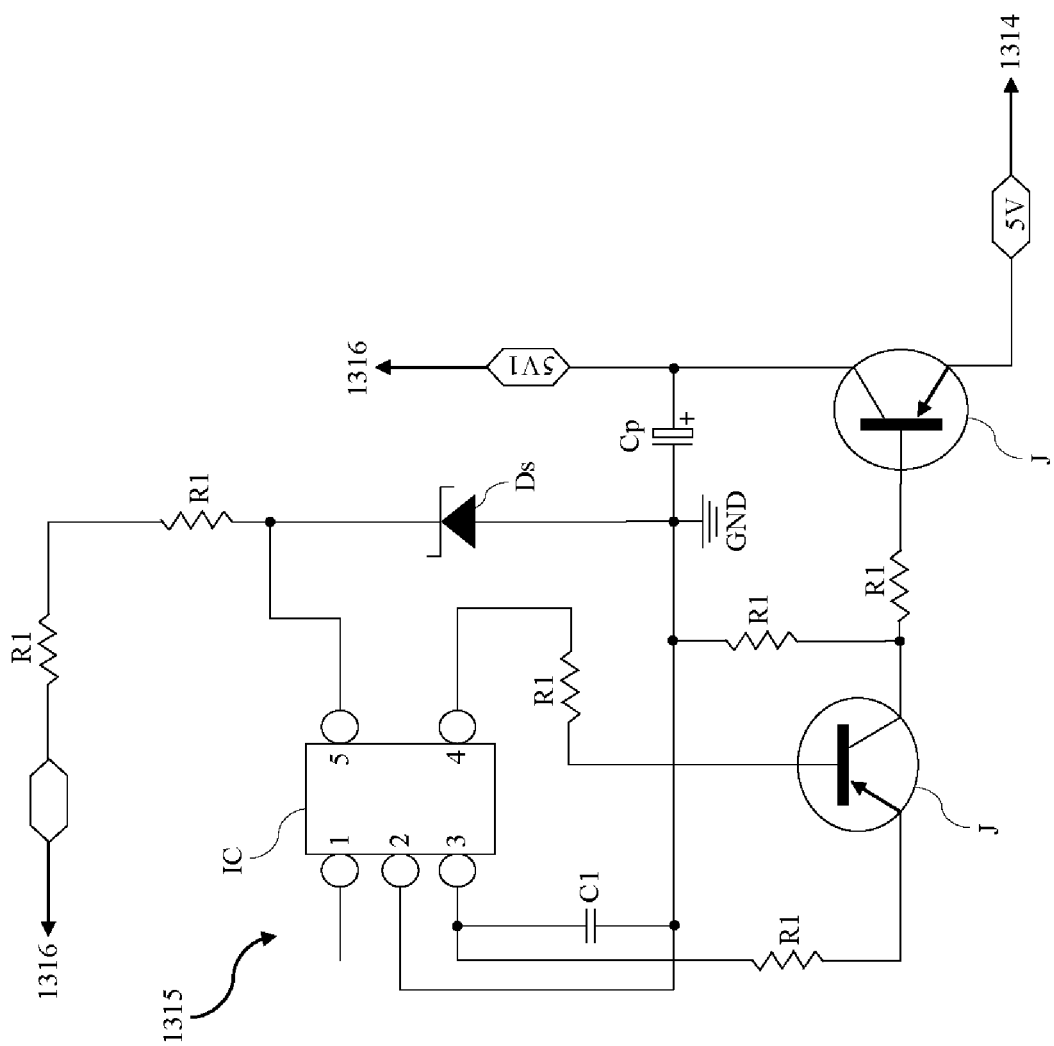
FIG. 3A is a view for illustrating the circuit of the leakage protection circuit of the dimmable lamp tube in accordance with the first embodiment of the present invention.
Figure 3B:
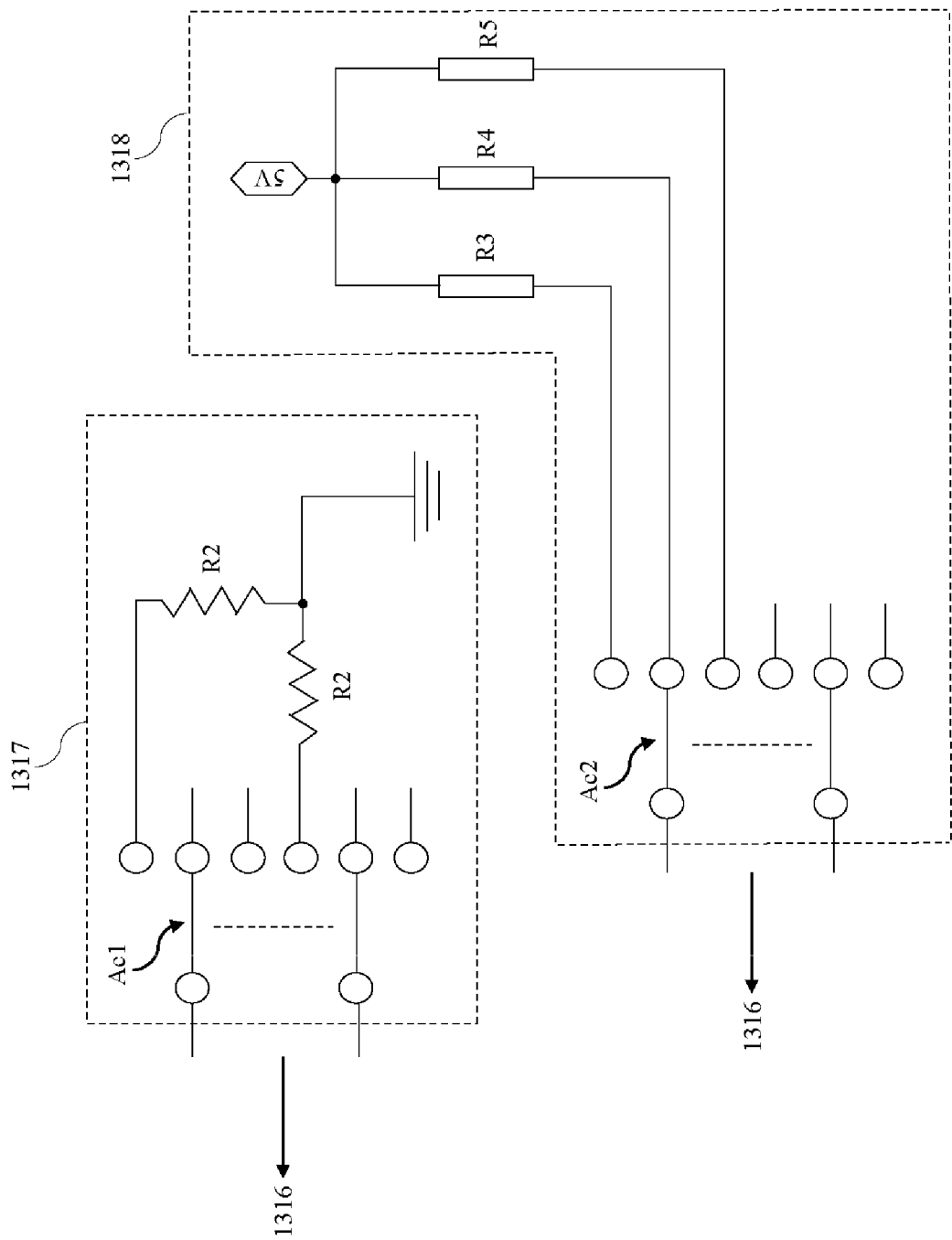
FIG. 3B is a view for illustrating the circuits of the brightness adjustment switch connection terminal and the power adjustment switch connection terminal of the intelligent control circuit of the dimmable lamp tube in accordance with the first embodiment of the present invention.

Please refer to FIG. 3A and FIG. 3B. FIG. 3A is a view for illustrating the circuit of the leakage protection circuit in accordance with the first embodiment of the present invention. FIG. 3B is a view for illustrating the circuits of the brightness adjustment switch connection terminal and the power adjustment switch connection terminal of the intelligent control circuit in accordance with the first embodiment of the present invention. Please also refer to FIG. 4A, FIG. 4B and FIG. 4C, which are schematic views for illustrating the leakage protection circuit of the dimmable lamp tube in accordance with the first embodiment of the present invention. This embodiment illustrates the preferred circuit designs of the leakage protection circuit 1315, the brightness adjustment switch connection terminal 1317 and the power adjustment switch connection terminal 1318 of the dimmable lamp tube 1.

FIG. 3A shows the preferred circuit design of the leakage protection circuit 1315, which includes a plurality of resistors R1, a control chip IC, a capacitor C1, an electrolytic capacitor Cp, a diode Ds and a plurality of transistors J. The leakage protection circuit 1315 is connected to the rectification filter circuit 1312.

The control chip IC includes two transistor switches, a first transistor and a second transistor. In addition, the control chip IC further includes a sampling resistor and a comparator. The pin 1 of the control chip IC is a spare pin. The pin 2 of the control chip is the ground pin. The pin 3 of the control chip IC is the Vcc pin (operating-voltage pin). The pin 4 of the control chip IC is the power pin. The pin 5 of the control chip IC is the DET pin (detection pin).

Figure 4B:
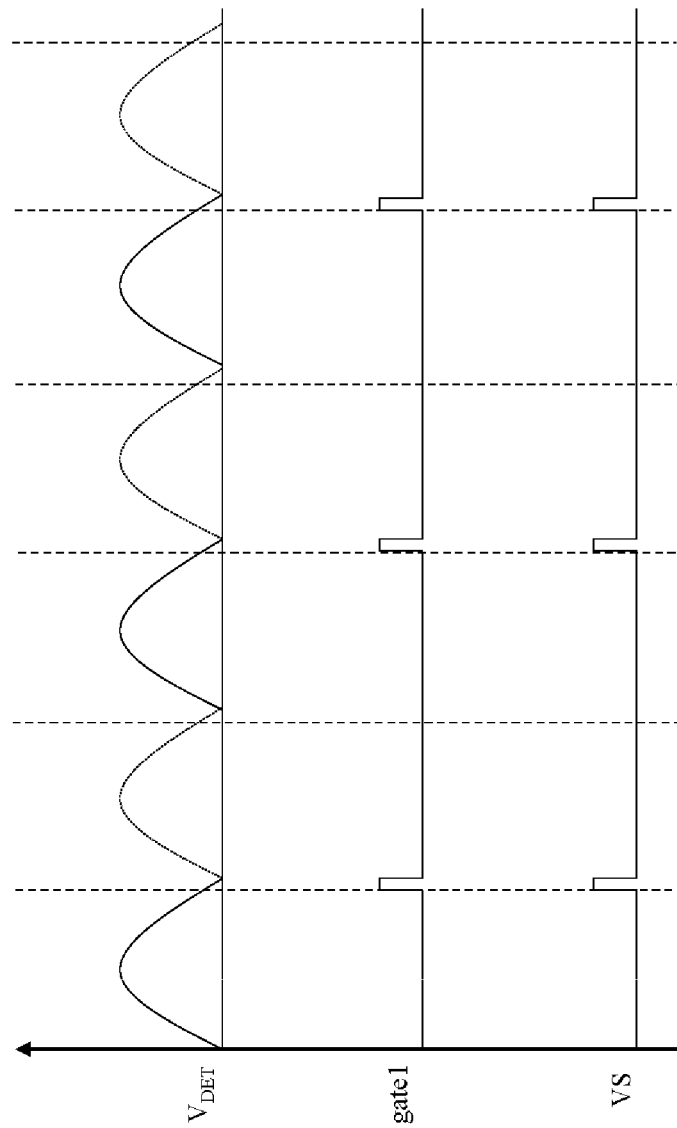
Figure 4C:
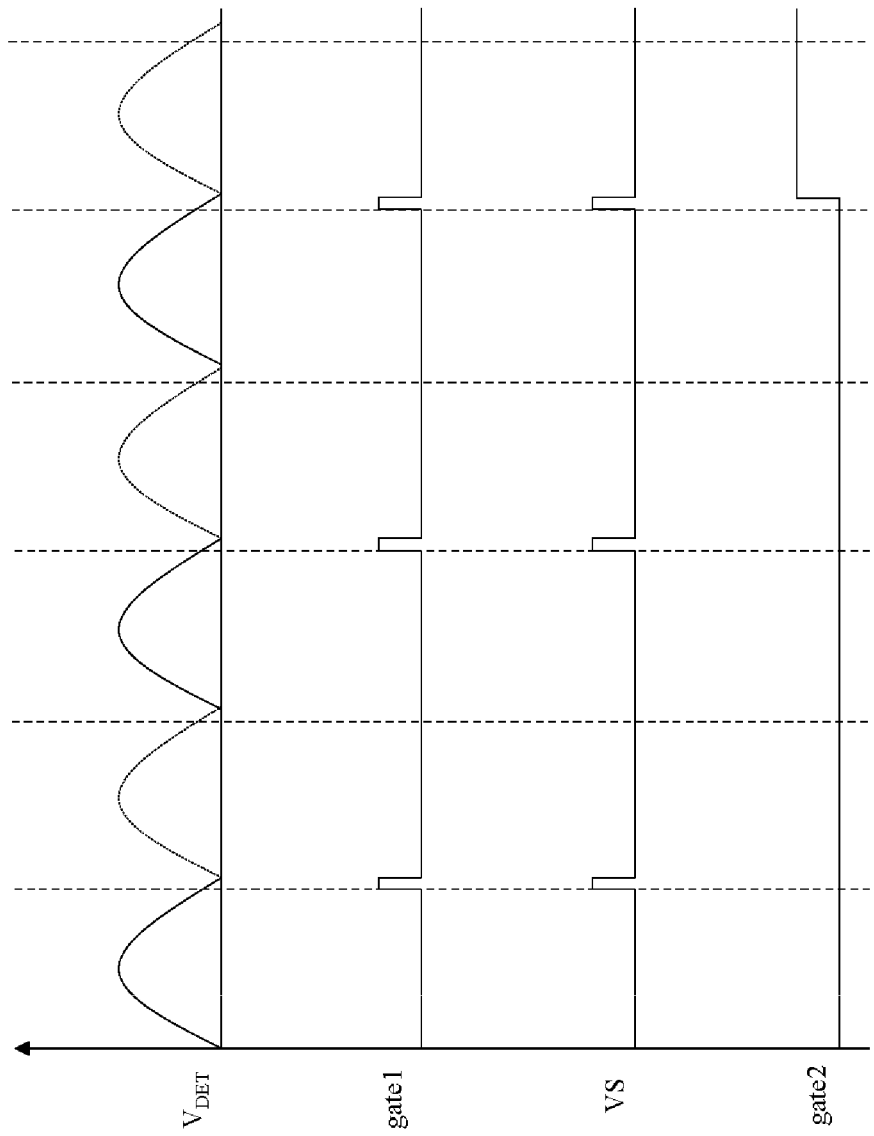

As shown in FIG. 4A, FIG. 4B and FIG. 4C, VDET stands for the voltage of the DET pin; VS stands for the voltage of the comparator; gate 2 stands for the gate of the second transistor. In this embodiment, after the human body resistor is connected, the operating mode of the control chip IC is as follows: 1) the DET pin detects the input voltage; 2) VDET reaches the position of 1V of the falling edge; 3) gate 1 is on for 30 us; 4) the control chip IC determines whether the voltage of the sampling resistor is greater than 1V during 30 us? 5) the voltage VS of the comparator is less than 1V at the moment that the human resistor is connected; 6) gate 2 remains low level. The above operating mode will be repeated at the next work cycle in order to keep performing inspection.

In this embodiment, after the human body resistor is connected, the operating mode of the control chip IC is as follows: 1) the DET pin detects the input voltage; 2) VDET reaches the position of 1V of the falling edge; 3) gate 1 is on for 30 us; 4) the control chip IC determines whether the voltage of the sampling resistor is greater than 1V during 30 us? 5) the voltage VS of the comparator is greater than 1V when the human resistor has not been connected yet; 6) the voltage VS of the comparator is greater than 1V for 3 consecutive work cycles, and gate 2 remains high level. Then, the dimmable lamp tube 1 enters the normal operating state and the inspection ends.

FIG. 3B shows the preferred circuit designs of the brightness adjustment switch connection terminal 1317 and the power adjustment switch connection terminal 1318. The brightness adjustment switch connection terminal 1317 includes a connection terminal Ac1 and a plurality of resistors R2. The power adjustment switch connection terminal 1318 includes a connection terminal Ac2 and a plurality of resistors R3, R4 and R5, which are corresponding to different powers. The brightness adjustment switch connection terminal 1317 and the power adjustment switch connection terminal 1318 are connected to the intelligent control circuit 1316.

The embodiment just exemplifies the present invention and is not intended to limit the scope of the present invention; any equivalent modification and variation according to the spirit of the present invention is to be also included within the scope of the following claims and their equivalents.

The circuit designs of the rectification filter circuit 1312, the constant-current control circuit 1313, the low-dropout regulating power source circuit 1314 and the intelligent control circuit 1316 are already known by those skilled in the art, so will not be described therein.

Figure 5:
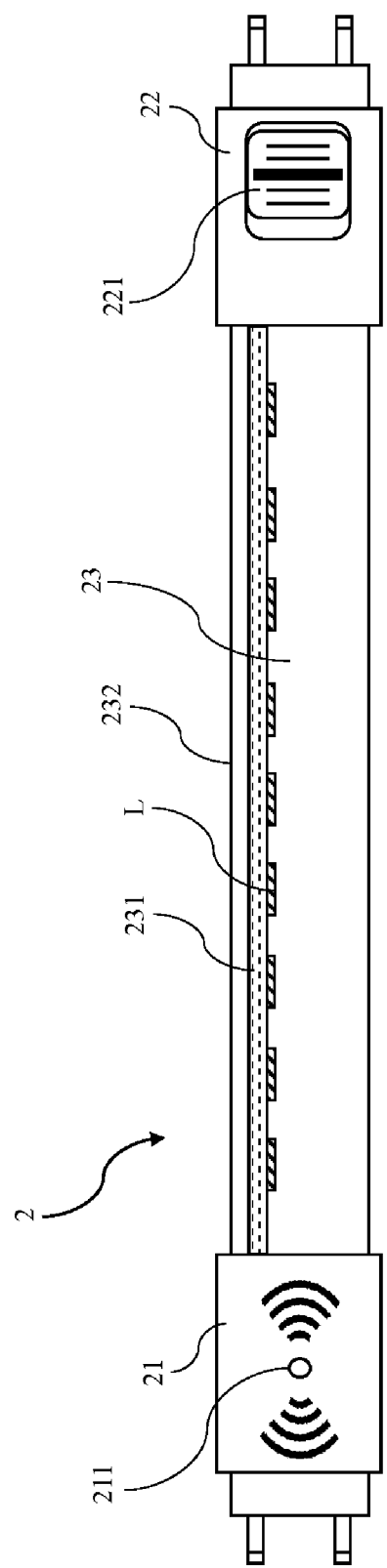
FIG. 5 is a view for illustrating the structure of a dimmable lamp tube in accordance with a second embodiment of the present invention.

Please refer to FIG. 5, which is a view for illustrating the structure of a dimmable lamp tube in accordance with a second embodiment of the present invention. As shown in FIG. 5, the dimmable lamp tube 2 includes a first lamp head 21, a second lamp head 22 and a lamp tube body 23.

The second lamp head 22 has a power adjustment switch 221.

The lamp tube body 23 includes a circuit board 231, a housing 232 and a plurality of light-emitting elements L. The light-emitting elements L are disposed on the circuit board 231. The circuit board 231 and the light-emitting elements L are disposed in the housing 232.

The difference between this embodiment and the first embodiment is that the brightness adjustment switch of the first lamp head 21 is replaced by a sensor device 211, which may be, but not limited to, a wireless sensor module. The sensor device 211 can emit signals to any moving persons or animals with a view to perform corresponding brightness adjustment.

Similarly, the power adjustment switch 221 of the second lamp head 22 can be also replaced by a sensor device so as to perform corresponding power adjustment.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the dimmable lamp tube has a brightness adjustment switch, a power adjustment switch and a proper circuit design corresponding thereto. Therefore, the user can appropriately adjust the brightness and the power of the dimmable lamp tube according to location and time so as to satisfy the lighting requirements of different locations and time periods. Besides, the electricity consumption can be also significantly reduced in order to achieve energy-saving.

Also, according to one embodiment of the present invention, the dimmable lamp tube can achieve multi-step brightness/power adjustment, smooth brightness/power adjustment and stepless brightness/power adjustment. Thus, the brightness and power of the dimmable lamp tube can completely satisfy the requirements in actual applications.

Further, according to one embodiment of the present invention, the dimmable lamp tube further includes the leakage protection circuit, which can avoid that the user gets electrocuted due to electrical leakage after one end of the lamp tube is connected to the power source. Accordingly, the safety of the dimmable lamp tube can be further enhanced.

Moreover, according to one embodiment of the present invention, the dimmable lamp further includes an intelligent control circuit, so the dimmable lamp tube can be integrated with a wall switch, a microwave radar control module and a human body infrared module with a view to realize different control mechanisms. Thus, the application of the dimmable lamp tube can be more comprehensive.

Furthermore, according to one embodiment of the present invention, the clever design of the dimmable lamp tube can achieve the desired technical effects without significantly increasing the cost thereof, so the dimmable lamp tube can have high commercial value.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dimmable lamp tube, comprising:
   a first lamp head, having a brightness adjustment switch;
   a second lamp head, having a power adjustment switch; and
   a lamp tube body, comprising a circuit board and a plurality of light-emitting elements disposed on the circuit board, wherein the circuit board comprises:
   a brightness adjustment switch connection terminal connected to the brightness adjustment switch and a power adjustment switch connection terminal connected to the power adjustment switch;
   a constant-current control circuit connected to the light-emitting elements;
   a rectification filter circuit connected to the constant-current control circuit, wherein the rectification filter circuit comprises a rectification circuit, an anti-EMI circuit, a surge protection circuit;
   a power source input terminal connected to the rectification filter circuit;
   a low-dropout regulating power source circuit connected to the rectification filter circuit; and
   a leakage protection circuit connected to the rectification filter circuit and the low-dropout regulating power source circuit.

2. The dimmable lamp tube as claimed in claim 1, wherein the circuit board further comprises an intelligent control circuit, wherein the brightness adjustment switch connection terminal and the power adjustment switch connection terminal are connected to the intelligent control circuit, and the intelligent control circuit is connected to the rectification filter circuit, the constant-current control circuit, the low-dropout regulating power source circuit and the leakage protection circuit.

3. The dimmable lamp tube as claimed in claim 1, wherein the power source input terminal is connected to a wall switch.

4. The dimmable lamp tube as claimed in claim 1, wherein the light-emitting elements are light-emitting diode beads.

5. The dimmable lamp tube as claimed in claim 1, wherein the lamp tube body further comprises a housing, and the circuit board and the light-emitting elements are disposed in the housing.

6. The dimmable lamp tube as claimed in claim 1, wherein the brightness adjustment switch and the power adjustment switch are toggle switches, rotary switches and push-button switches.

* * * * *